Patented Nov. 27, 1934

1,982,149

UNITED STATES PATENT OFFICE 1,982,149

ALUMINIUM LAKES OF SULPHONATED COMPOUNDS OF THE ANTHRAQUINONE SERIES

Fritz Baumann, Leverkusen-on-the-Rhine, Germany, assignor to General Aniline Works, Inc., New York, N. Y., a corporation of Delaware No Drawing. Original application June 4, 1931, Serial No. 542,204. Divided and this application May 27, 1933, Serial No. 673,325. In Germany June 4, 1930

2 Claims. (Cl. 260—11)

The present invention relates to aluminium, beryllium and copper lakes of sulphonated compounds of the anthraquinone series.

Sulphonated compounds of the anthraquinone series corresponding to the formula:—

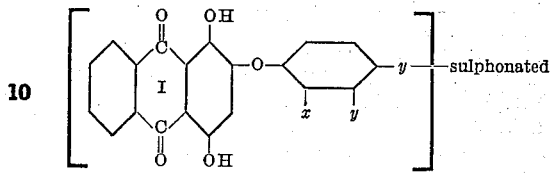

wherein $x$ means hydrogen or alkyl, one $y$ means hydrogen, alkyl, halogen, the carboxylic acid group, a carboxylic acid ester group or an acyl group ($CH_3$—CO—, $C_6H_5$—CO—, etc.), the other $y$ means hydrogen, are obtainable in the following manner:—

A 2-halogenquinizarine, such as 2-chloro- or 2-bromo-quinizarine, is caused to react with a phenolic compound of the formula:—

wherein the letters $x$ and $y$ are to be defined as above, in the presence of an alkali, such as sodium- or potassium hydroxide, potassium- or sodium carbonate etc. The reaction is performed while heating the reaction mixture, advantageously to a temperature between about 140–200° C. Instead of the phenolic compound, an alkali metal salt of the same may be applied, in which case the reaction may be performed without the addition of an alkali.

A suitable solvent which is inert to the starting materials may be added to the reaction mixture, but it is a preferred method of working to apply the phenolic compound in such an amount that the further addition of another solvent is unnecessary.

In some cases the reaction is favorably influenced by the addition of copper or suitable salts thereof, such as copper chloride, cuprous bromide, copper acetate, etc.

As phenolic compounds suitable for performing the reaction, there may be mentioned, by way of example, phenol-, ortho-, meta- or para-cresol, ortho-, meta- or para-ethylphenols, meta-chlorophenol, meta-bromophenol, 4-chloro-2-methyl-phenol (1), para-hydroxybenzophenone, para-hydroxyacetophenone, meta- or para-benzoic acid methyl- or ethylester etc.

In this manner there are produced compounds of the formula:—

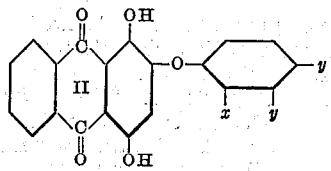

wherein the letters $x$ and $y$ are to be defined as for the formula marked I. They are reddish-brown substances dissolving in concentrated sulphuric acid with a bluish-red coloration and in dilute alkalies with a blue coloration. The new compounds can be recrystallized from suitable organic solvents, such as glacial acetic acid, amyl alcohol, dichlorobenzene, etc.

The manner in which the sulphonation of the compounds thus obtained is carried out, depends on the nature of the compound in question. While, for example, the unsubstituted 2-phenoxyquinizarine is sulphonated even in monohydrate at room temperature, the para-cresol- or para-chlorophenol derivatives necessitate the use of fuming sulphuric acid of about 5–20% strength and of a temperature of about 30–70° C. The compounds obtained from para-hydroxybenzoic acid or the methyl- or ethylesters thereof require even a temperature of 140–150° C. and fuming sulphuric acid of 30% strength. In other cases again a mixture of monohydrate and chlorosulphonic acid yields better results. Likewise, the addition of boric acid will be useful in many cases.

I do not know up-to-date the exact chemical structure of the compounds in question, that means, the position of the sulphonic acid groups entering the molecule. One or two sulphonic acid groups may enter the molecule, depending as well on the substituents being present in the benzene nucleus as on the particular sulphonation method applied. It may be presumed that at least one sulphonic acid group enters the benzene nucleus attached to the anthraquinone nucleus by means of oxygen. However, I am not aware, whether the second sulphonic acid group, in case it can be introduced into the molecule at all, enters also the benzene nucleus above mentioned or another nucleus.

The orange to brown colored sodium salts of the sulphonic acids thus obtainable, which almost all crystallize well, dissolve in water with an orange to yellowish brown coloration. Moreover, they are distinguished by the fact that on treatment with metallic compounds suitable for lake formation, they yield hitherto unknown clear red pigments of very satisfactory fastness properties. There come into consideration compounds of metals, such as beryllium, aluminium, copper and the like, in particular their hydroxides, carbonates etc.

The lake formation is carried out in the known manner, for example, by dissolving the phenoxyquinizarine sulphonic acid in water and precipitating the lake by the addition of a metallic hydroxide, such as aluminium hydroxide, or by dissolving the sulphonic acid, from which the lake is to be produced in water in the presence of aluminium sulphate and precipitating the lake by means of sodium carbonate. After boiling for a short time, the pigment dyestuff is filtered, washed and dried.

The following examples illustrate my invention, without, however, restricting it thereto, the parts being by weight:—

Example 1

100 parts of pure para-cresol and 5.4 parts of a 30% aqueous caustic soda solution are heated to boiling for a short time in order to remove the water. 9.6 parts of 2-bromoquinizarine (Berichte der deutschen chemischen Gesellschaft, vol. 33, page 1658) and 0.3 part of copper acetate are then added and the mixture is heated to boiling, until a test portion no longer shows a halogen reaction. After cooling to about 80° C. and diluting with 200 parts of methyl alcohol, to which dilute hydrochloric acid may be added if required, the precipitated orange-brown cresol derivative is filtered by suction at room temperature. After washing with methyl alcohol and water it is dried. For further purification the substance may be crystallized from glacial acetic acid. It dissolves in concentrated sulphuric acid with a bluish-red coloration and in dilute caustic soda solution with a blue coloration.

The sulphonation is carried out in 10 parts of fuming sulphuric acid of 5% strength at about 30° C. The sulphonic acid is isolated in the form of the sodium salt and can be directly used for lake formation. For this purpose 2 parts of the sulphonic acid are dissolved in 2000 parts of water, an aqueous suspension of beryllium hydroxide (produced from 40 parts of crystallized beryllium nitrate) is added to the boiling solution and the whole is heated to boiling, if desired, with the addition of barium chloride, until the red beryllium lake has separated. The precipitate is filtered with suction while hot, washed with water and dried. Aluminium hydroxide or other fillers can be added to the red lake after precipitation.

Example 2

150 parts of para-chlorophenol, 10 parts of 30% caustic soda solution, 16 parts of 2-bromoquinizarine and 0.5 part of copper acetate are heated to boiling for about 3 hours, until a test portion dissolved in sulphuric acid shows no further change. After cooling to about 90° C., 300 parts of methyl alcohol are stirred in, and the reaction product is isolated by filtering with suction. The compound crystallizes from glacial acetic acid in long reddish-brown needles, which melt at 185° C. Instead of the above mentioned bromoquinizarine, 2-chloroquinizarine can likewise be used for the reaction.

On heating the new compound to 70° C. in 12 parts of fuming sulphuric acid of 20% strength, sulphonation occurs. When a test portion is completely soluble in water, the cooled melt is poured into a mixture of ice and sodium chloride. The sodium salt which separates is filtered with suction and washed several times with dilute sodium chloride solution. The solution of the sulphonic acid in dilute caustic soda solution shows a violet coloration, that in concentrated sulphuric acid a bluish-red coloration.

The aluminium lake is obtained by dissolving 10 parts of the sulphonic acid in 4000 parts of water, adding 2000 parts of a 10% aluminium sulphate solution and 840 parts of a 10% aqueous sodium carbonate solution. The precipitation is complete after boiling for a short time. The pigment dyestuff is isolated by filtering with suction and dried after washing.

Pigment dyestuffs of a quite similar kind can be obtained from the sulphonic acid of the corresponding para-cresol compound.

Example 3

40 parts of para-hydroxybenzoic acid methyl-ester, 1.6 parts of sodium methylate and 6.4 parts of 2-bromo-quinizarine are stirred at 180–185° C. The reaction proceeds fairly quickly, and after one hour unchanged bromoquinizarine cannot be traced any more in a test portion. When the reaction is complete, the excess of hydroxy benzoic acid ester is dissolved out with methyl alcohol after cooling of the reaction mixture. After working up in the customary manner, the reaction product obtained can be crystallized from glacial acetic acid and is thus obtained in form of small orange tablets melting at 170° C.

When caustic soda solution is added to the ester in pyridine water, the ester is saponified to the carboxylic acid and can then be directly used for lake formation.

*Sulphonation.*—The hydroxybenzoic acid ester derivative is sulphonated in the presence of boric acid with fuming sulphuric acid of 30% strength at 140–150° C. The sulphonic acid thus obtained forms an orange sodium salt, which crystallizes well and dissolves in dilute alkali with a violet coloration and in concentrated sulphuric acid with a red coloration.

*Lake formation.*—5 parts of the above sulphonic acid are dissolved in 2000 parts of water, 250 parts of a 10% aluminium hydroxide paste are added, and the whole is heated to boiling for some time, until precipitation of the aluminium lake is complete. The working up is carried out in the customary manner. The lake yields clear red paintings of very satisfactory fastness to light.

Example 4

15 parts of 2-bromoquinizarine, 7.5 parts of sodium phenolate and 0.4 part of copper acetate are stirred into 150 parts of phenol, while heating the reaction mixture to boiling. The first violet colored thick melt gradually becomes orange colored and mobile. As soon as unchanged starting material can no longer be detected, the mixture is cooled and, at a temperature of 70° C., diluted with 300 parts of methanol. The 2-phenoxyquinizarine, which separates in clear orange colored needles, is filtered by suction at room temperature, washed and dried. It crystallizes from glacial acetic acid or para-chlorotoluene in orange colored needles, melting at 209–211° C.

*Sulphonation.*—(a) 2-phenoxyquinizarine is sulphonated by dissolving it in ten times the quantity of sulphuric acid, which contains about 2% of free SO₃. Isolation of the monosulphonic acid formed is effected in the usual manner in form of its orange red sodium salt. The solution of the sulphonic acid in strong sulphuric acid is bluish-red.

(b) 10 parts of 2-phenoxyquinizarine and 4 parts of crystallized boric acid are heated to 80° C. in 80 parts of fuming sulphuric acid of 20% strength, until solution is complete. 80 parts of fuming sulphuric acid of 30% strength are added while raising the temperature to 135–140° C. The sulphonation is interrupted as soon as a worked up test portion dissolves in sulphuric acid with a yellowish-red coloration.

The reaction mixture is then poured into ice water, a small amount of bisulphite is added and salting out of the disulphonic acid is effected by the addition of potassium chloride. The potassium salt assumes a crystalline structure when heated to a temperature of 60–70° C. After cooling, the orange-red crystals are filtered with suction and dried after repeated washing with a solution of potassium chloride.

The pure potassium salt contains 10.8% of sulphur; calculated for the disulphonic acid 11.3% of sulphur.

*Lake formation.*—When the sulphonic acids obtainable according to (a) and (b) are converted into their aluminium lakes according to the method described in Example 3, valuable bluish-red lakes are obtained.

Although the appended claims define only the aluminium lakes, I wish it to be understood that the corresponding beryllium and copper lakes are obvious chemical equivalents of these aluminium lakes and as such are intended to be included within the scope of protection afforded by these claims.

This is a division of my co-pending application Serial No. 542,204, filed June 4th, 1931 on which the U. S. Patent No. 1,917,421 was granted July 11, 1933.

I claim:—

1. The aluminium lakes of the compounds having in their free form the general formula:—

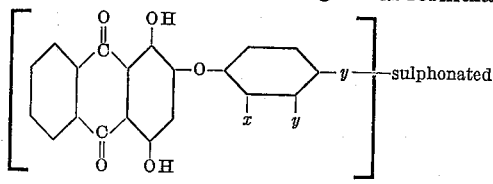

wherein $x$ stands for hydrogen or alkyl, one $y$ means hydrogen, alkyl, halogen, the carboxylic acid group, a carboxylic acid ester group or an acyl group, the other $y$ means hydrogen, said lakes being valuable clear red pigment dyestuffs of good fastness properties.

2. The aluminium lakes of the compounds having in their free form the formula:—

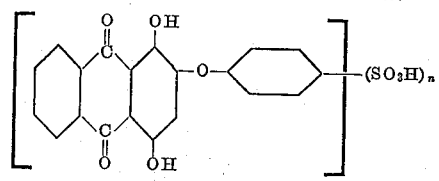

wherein $n$ means one of the numbers one or two, said lakes being valuable clear red pigment dyestuffs of good fastness properties.

FRITZ BAUMANN.